US010218142B1

(12) United States Patent
Hsia et al.

(10) Patent No.: US 10,218,142 B1
(45) Date of Patent: Feb. 26, 2019

(54) PACKAGING OF AN OPTICAL FIBER COMBINER NOT IMMERSED IN COOLING WATER IN HIGH-POWER LASER APPLICATIONS

(71) Applicant: Lightel Technologies, Inc., Renton, WA (US)

(72) Inventors: Chungho Hsia, Bellevue, WA (US); Pai-Sheng Shen, Bellevue, WA (US)

(73) Assignee: LIGHTEL TECHNOLOGIES, INC., Renton, VA (US)

( * ) Notice: Subject to any disclaimer, the term of this patent is extended or adjusted under 35 U.S.C. 154(b) by 0 days.

(21) Appl. No.: 16/163,835

(22) Filed: Oct. 18, 2018

Related U.S. Application Data

(63) Continuation-in-part of application No. 16/148,595, filed on Oct. 1, 2018, which is a continuation-in-part of application No. 15/727,569, filed on Oct. 7, 2017, now Pat. No. 10,101,550.

(51) Int. Cl.
| | |
|---|---|
| *F21V 8/00* | (2006.01) |
| *H01S 3/04* | (2006.01) |
| *H01S 3/067* | (2006.01) |
| *H01S 3/094* | (2006.01) |
| *G02B 6/44* | (2006.01) |

(52) U.S. Cl.
CPC .......... *H01S 3/0407* (2013.01); *G02B 6/0008* (2013.01); *H01S 3/0401* (2013.01); *H01S 3/06704* (2013.01); *H01S 3/06745* (2013.01); *H01S 3/094003* (2013.01)

(58) Field of Classification Search
CPC .................................. G02B 6/00; F21V 8/00
USPC ....................................... 362/553, 551, 554
See application file for complete search history.

(56) References Cited

U.S. PATENT DOCUMENTS

| | | | |
|---|---|---|---|
| 2004/0165620 A1* | 8/2004 | Rogers ..................... | G02B 6/04 372/6 |
| 2009/0175301 A1* | 7/2009 | Li ......................... | G02B 6/2835 372/6 |
| 2012/0069860 A1* | 3/2012 | Inbar ................... | H01S 3/06791 372/6 |

* cited by examiner

*Primary Examiner* — Edwyn Labaze
(74) *Attorney, Agent, or Firm* — Han IP PLLC; Andy M. Han

(57) ABSTRACT

A water-cooled package of an optical fiber combiner (OFC) comprising an OFC assembly, a front end cap (EC), a rear EC, and a housing operates for long term reliability. The OFC assembly comprises two submounts and an OFC. Each of the two submounts comprises a U-groove in a lengthwise direction and two flat portions symmetrically connected to the U-groove in a widthwise direction. The two flat portions of each of the two submounts are mechanically coincident in a way to form a cavity between the two U-grooves of the two submounts, in which the OFC is fixed. When the OFC assembly is concentrically mated and sealed with the front EC and the rear EC, cooling water in the water-cooled package is prevented from immersing the OFC. The configurations can minimize varying stress-induced optical degradations and maintain beam quality of a laser light exiting the OFC.

20 Claims, 5 Drawing Sheets

PACKAGING OF AN OPTICAL FIBER COMBINER NOT IMMERSED IN COOLING WATER IN HIGH-POWER LASER APPLICATIONS

CROSS-REFERENCE TO RELATED APPLICATIONS

The present disclosure is part of a continuation-in-part (CIP) application of U.S. patent application Ser. No. 16/148,595, filed on 1 Oct. 2018, which is a CIP application of U.S. patent application Ser. No. 15/727,569, filed on 7 Oct. 2017 and issued on 16 Oct. 2018 as U.S. Pat. No. 10,101,550. Contents of the above-identified applications are incorporated herein by reference in their entireties.

TECHNICAL FIELD

The present disclosure relates to packaging of an optical fiber combiner used in high-power laser applications and, more particularly, to various water-cooled schemes in packaging such an optical fiber combiner with an optical fiber combiner not immersed in cooling water to maintain long-term reliability of the optical fiber combiner and laser beam quality in high-power fiber laser applications.

BACKGROUND

High-power fiber lasers have received a wide attention in the past ten years. Such lasers with several kilowatts (kWs) or several tens of kWs have been used as commercially available products in industries. In comparison with solid-state lasers, fiber lasers have a unique feature of a superb beam quality at high power due to an all-fiber configuration. That is, all the optical components used in the fiber lasers are of an optical fiber type, connected using fusion splices without air interfaces between any two of the optical components in connection. The optical components include multiple diode laser pumps with multiple optical fiber pigtails, an amplification optical fiber with two fiber Bragg gratings, a transmission fiber spliced to the amplification optical fiber, and an optical fiber combiner with multiple input optical fibers to splice to the multiple optical fiber pigtails of the multiple diode laser pumps and with an output optical fiber to splice to the amplification optical fiber. The amplification optical fiber, doped with a rare earth element such as erbium (Er) or ytterbium (Yb) as a gain medium, provides for a beneficial geometry and a large surface to volume ratio, thus allowing for extraordinary heat dispersion and reducing thermal lensing effect when compared to rod type solid state lasers. The amplification optical fiber with the gain medium receives and absorbs optical energy from the multiple diode laser pumps through the optical fiber combiner and creates a coherent laser light via a resonator built by using the two fiber Bragg gratings at two ends of the amplification optical fiber. Such multimode fiber lasers in the 2- to 6-kW regime are ideal for cutting and welding, and particularly in the area of materials processing and laser machining as a reliable replacement for bulky diode pumped solid-state lasers and $CO_2$ lasers. It has been shown that lengthening the amplification optical fiber can inherently increase power of the fiber lasers without a limit. However, double clad optical fibers (DCOFs) used in both the output optical fiber of the optical fiber combiner and the amplification optical fiber are surrounded by a polymer coating with a limited tolerance to heat. In other words, the maximum thermal load provided by the coating dictates the maximum output power that the fiber laser can attain.

Not similar to optical fibers used in optical communications, where the coatings outside the optical fibers simply play a role of mechanical protection, the polymer coatings used in DCOFs perform both mechanical and optical functions. DCOFs use dual acrylate coatings, with a first low refractive index polymer coating in contact with the glass core, and with a durable second coating to protect the first relatively soft low refractive index coating. In other words, the second coating mechanically protects the low refractive index coating from mechanical chips, cuts, or scratches which may result in optical energy to leak out from the fiber, possibly creating localized hot spots or catastrophic burns at high pump powers. DCOFs with the dual acrylate coating can pass the stringent reliability test specified by Telcodia GR-20 standard used in the telecom industry. Without doubt, DCOFs with the dual acrylate coating have a high tensile strength of greater than 700 kilo-pounds per square inch (kpsi) and an exceptional stress corrosion resistance. However, according to the GR-20 standard, after exposing DCOFs to an environment of 85° C. and 85% relative humidity (RH) for 720 hours, it shows an excess loss for laser output power due to possible degradation of the low refractive index coating in exposure to temperature and humidity. It is noted that the 85° C./85% condition not only affects the optical reliability of the low refractive index coating but also causes OH ingression into the glass core of the optical fiber, increasing attenuation of the glass core. For example, the attenuation in the typical pump wavelength range is well below a negligible 0.01 dB/m. After exposure the optical fiber to temperature and humidity, either wavelength-dependent or independent attenuation increases. The attenuation, in general, is associated with OH ingression in the silica, glass defects formed due to moisture ingression, and light scattered by the low refractive index polymer. That is, during the 85° C./85% RH test, moisture not only degrades the low-index polymer but also penetrates the glass cladding, resulting in the excess fiber loss.

An N×1 tapered fiber bundles (TFBs) or optical fiber combiner is used to combine multiple ("N") input multimode fiber pigtails from pump diodes into a single output fiber. The "N" satisfies the brightness conservation theorem, and the maximum "N" is 6, 13, 17, 24, 53, 63, 136, etc., depending on various combinations of various diameter and numerical aperture (NA) of the input optical fibers and the output optical fiber. In practice, the N is chosen to be far smaller than the maximum numbers specified above to provide some margin. The optical fiber combiner is typically fabricated in a process similar to fused fiber couplers by bundling in parallel N multimode optical fibers that have been stripped of their polymer coatings. The fibers are then fused and tapered by heating with a flame such as electric arc, oxyhydrogen flame, or a $CO_2$ laser beam. The fused and tapered section is then cleaved in the middle and spliced to the single output fiber. The use of optical fiber combiners to combine multiple laser diode pumps into one fiber is essential for pumping the high-power fiber lasers. For a 7×1 combiner, each of seven input optical fibers with 200-μm diameter and 0.22 NA receives, for example, 200 W from each diode laser pump. Seven such laser pumps are combined into a single 400 μm double-clad fiber with 0.46 NA. This configuration gives a pumping module composed of active and passive components, delivering 1.4 kWs power for a fiber laser, based on the commercially available 200-W laser diode pumps. For more examples, with a Yb-doped fiber of 400 μm and 0.46 NA, a common optical fiber combiner coupling six 200 μm 0.22 NA pump delivery fibers each with a pump power of 500 W provides a total power greater than 3 kWs. Using a 19×1 optical fiber combiner and greater than 100-W pump power delivered in each 105-μm input optical fiber, a total of about 2-kW pump power can be achieved.

The optical fiber combiners can also be used in optical fiber amplifiers to combine pump and signal light that is confined to the core of the double-clad fiber. In this housing, the fiber in the center of the optical fiber combiner is replaced by a fiber with a core carrying an amplifier seed. This is commonly referred to as an (N+1)×1 combiner, which is critical for the optical fiber amplifiers. As an example, a (6+1)×1 combiner accommodating six pump fibers and one signal fiber can be used for a 1-kW co-pumped optical fiber amplifier, based on six pump diodes each delivering, for example, 250 W of pump power for a total pump power of 1.5 kWs. No matter whether 7×1 or (6+1)×1, the optical fiber combiner needs to be thermally managed to maintain its reliability. Specifically, the residual pump power, ASE power, and unwanted signal power trapped in the cladding of a double-clad fiber in the fiber laser or the optical fiber amplifier need to be removed to avoid potential damage to components downstream. The residual pump power can be in the hundreds of watts in kW fiber lasers and the ASE can be in the range of many watts, typically much higher in the optical fiber amplifier. The unwanted energy launching into the cladding of a double-clad fiber creates localized hot spots or catastrophic burns at high pump powers. The most efficient way to remove the cladding light is to strip the low-index fluoroacrylic coating off a length of the fiber and re-coat it with a high-index coating so that high-NA cladding light can be stripped.

As mentioned above, high-power optical fiber combiners are critical for highly reliable high-power fiber lasers. In the high-power fiber lasers, an integrated water-cooled package has been proposed, in which an N×1 optical fiber combiner is completely immersed in the circulating water for efficient cooling. In this housing, however, OH ingression in the silica and glass defects generated from moisture ingression can reduce the reliability of such N×1 optical fiber combiner. It is, therefore, the purpose of this patent application to disclose a thermal dispersion scheme that can be used in packaging the optical fiber combiner without immersing the optical fiber combiner in cooling water while effectively removing heat from so called localized hot spots. In this case, the N×1 optical fiber combiner remains its reliability by not exposing the N×1 optical fiber combiner to water.

SUMMARY

A water-cooled package of an optical fiber combiner comprising an optical fiber combiner assembly, a front end cap, a rear end cap, and a housing operates for a uniform temperature gradient inside the housing and for long-term reliability. The optical fiber combiner assembly comprises a combiner mount and an optical fiber combiner. The combiner mount comprises a first submount and a second submount, each comprising a U-groove in a lengthwise direction and two flat portions symmetrically connected to the U-groove in a widthwise direction, wherein the two flat portions of the first submount and the two flat portions of the second submount are mechanically coincident in a way to form a combiner cavity between the U-groove of the first submount and the U-groove of the second submount. The combiner cavity is configured to accommodate the optical fiber combiner.

The optical fiber combiner comprises a tapered fiber bundle (TFB) with multiple input optical fibers connected to multiple laser diode pumps and an output optical fiber spliced to a smaller taper end of the TFB. The multiple input optical fibers and the output optical fiber are partially stripped for a stripped portion substantially in a middle area of the optical fiber combiner and two non-stripped portions out of the stripped portion. The optical fiber combiner is further fixed in the combiner cavity with three epoxies respectively applied in three areas. The first area is in the middle area of the stripped portion of the optical fiber combiner, where the output optical fiber is spliced to a smaller taper end of the TFB. The second area is near an interface between the stripped portion and the non-stripped portions near the multiple input optical fibers. The third area is near an interface between the stripped portion and the non-stripped portions near the output optical fiber. The three epoxies with different refractive indices accommodated in the three areas not only fix the optical fiber combiner in place but also serve thermal conductive contacts to effectively disperse the heat generated in the optical fiber combiner to the combiner mount, further dispersing to surroundings of the housing. This is especially true when both the first submount and the second submount are in contact with the three epoxies to doubly increase thermal contact area. In thermal dispersion, the thermal contact approach outperforms a conventional approach using air as a thermal dispersion medium. Furthermore, the three epoxies comprise respective high, low, and high refractive indices relative to a refractive index of the cladding of the multiple input optical fibers and the output optical fiber. The epoxy with the high refractive index is applied to help strip cladding modes, preventing the cladding modes from launching into a buffer layer and a jacket of the two non-stripped portions in the optical fiber combiner to minimize occurrence of localized hot spots which may possibly damage the optical fiber combiner. The epoxy with the low refractive index is applied to guide higher-order modes to remain in the optical fiber combiner, preventing optical energy from going out of the fiber combiner resulting in an optical loss.

Each of the first submount and the second submount may comprise a resin and a metal powder mixed in the resin to achieve a predetermined thermal conductivity and a predetermined thermal expansion coefficient that are needed to control heat dispersion and to maintain reliability in the optical fiber combiner used in high-power pump applications. Each of the first submount and the second submount may be made of a polymer material. Each of the first submount and the second submount may be made of an optically transparent material such as sapphire. Each of the first submount and the second submount may comprise a semicircle contour, and wherein when the combiner cavity is formed, the combiner mount comprises a circular contour. A laser welding approach may be used to weld the first submount and the second submount together after the optical fiber combiner is fixed inside the combiner mount. The combiner mount processed by the laser welding is waterproof at least along interface lines between the first submount and the second submount.

Each of the front end cap and the rear end cap comprises an end cap inner wall and an end cap outer wall. The end cap inner wall is configured to accommodate the optical fiber combiner assembly. The housing comprises an internally hollow space and a housing inner wall. The end cap outer wall of each of the front end cap and the rear end cap is concentrically mated with the housing inner wall. The housing is configured to hold and fix the front end cap and the rear end cap and to accommodate the cooling water to facilitate thermal dispersion. When fixed and sealed in the housing, the front end cap and the rear end cap can prevent the cooling water from leaking out via two ends of the housing. The housing is waterproof at each of interfaces between the front end cap and the combiner mount, between the combiner mount and the rear end cap, between the front end cap and the housing, and between the rear end cap and the housing. When the optical fiber combiner assembly is concentrically mated and sealed with the front end cap and the rear end cap, cooling water in the water-cooled package is prevented from immersing the optical fiber combiner. The configurations can minimize varying stress-induced optical degradations and maintain beam quality of a laser light exiting the optical fiber combiner assembly. The front end cap may further comprise a funnel structure configured to accommodate the multiple input optical fibers and to allow an epoxy to apply so as to secure the multiple input optical fibers in place and serve as a strain relief to allow flexibility without exerting stress on the multiple input optical fibers.

Each of the front end cap and the rear end cap protrudes the housing so that respective interface edges are formed, wherein a first bonding agent can easily be applied and wicked from the respective interface edges into gaps between the front end cap and the housing and between the rear end cap and the housing to fix thereof. Furthermore, the optical fiber combiner assembly protrudes the rear end cap so that an interface edge is formed and wherein a second bonding agent can easily be applied and wicked from the interface edge into gaps between the optical fiber combiner assembly and the rear end cap to fix thereof. The optical fiber combiner assembly is recessed from the front end cap so that an interface edge is formed, wherein a third bonding agent can easily be applied and wicked from the interface edge into gaps between the optical fiber combiner assembly and the front end cap to fix thereof. Each of the first, the second, and the third bonding agents may comprise a solder or an epoxy.

Each end cap outer wall of the front end cap and the rear end cap may comprise a coating of gold, substantially in contact with the housing inner wall. The housing may be made of copper, wherein a solder is used to fill gaps between the end cap outer wall of each of the front end cap and the rear end cap and the housing inner wall and to fix the front end cap and the rear end cap in the housing. In this case, the front end cap and rear end cap can be readily fixed in the housing by solder bonding, taking one of advantages that the solder has a inherently high melting temperature such as 180 degrees in Celsius relative to an epoxy, a glue, or an adhesive having a glass transition temperature (Tg) of 100 degrees in Celsius or so. If the first submount and the second submount are made of glass or sapphire, outer surfaces of the first submount and the second submount near their two ends can be coated with the gold. When inserted in the front end cap and the rear end cap, the combiner mount can be fixed and sealed with the solder. In this case, the water-cooled package using the solder can survive in the temperature of 180 degrees in Celsius relative to 100 degrees in Celsius or so for the package using the epoxy. The housing further comprises a water inlet and a water outlet configured to circulate the cooling water and to remove heat from the front end cap, the rear end cap, and the optical fiber combiner assembly, facilitating thermal dispersion.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
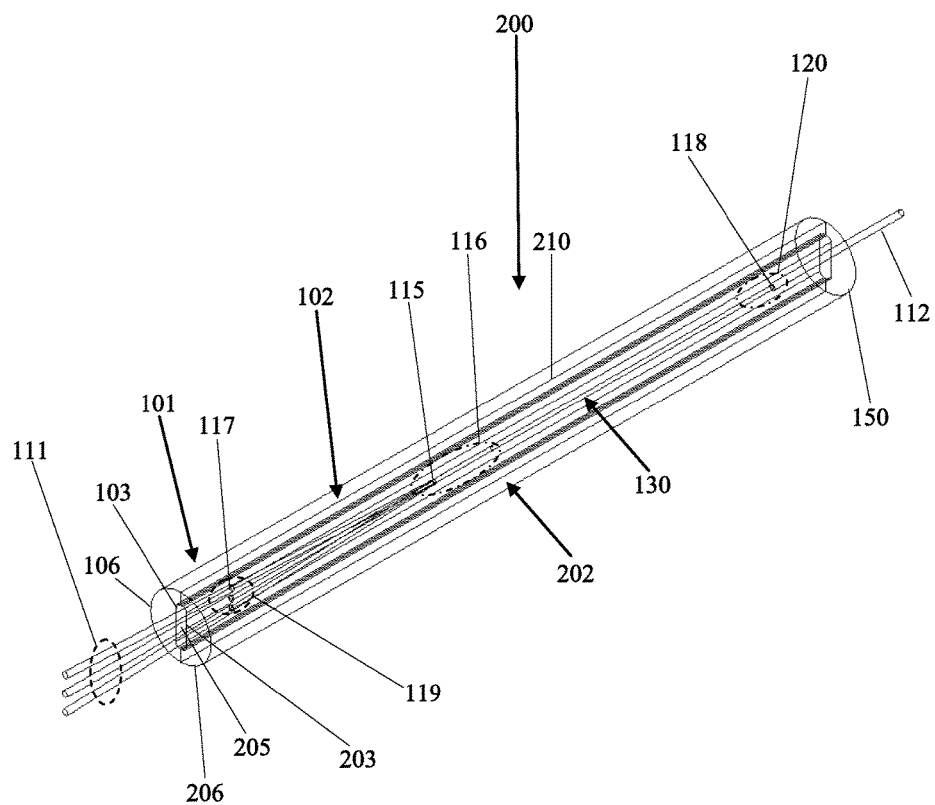
FIG. 1 is a cross-section view of an optical fiber combiner assembly in an isometric-view orientation according to the present disclosure.

Reference will now be made in detail to the preferred embodiments of the disclosure. Wherever possible, same or similar reference numerals are used in the drawings and the description to refer to the same or like parts or steps. The drawings are in their simplest form and are not to scale.

Figure 2:
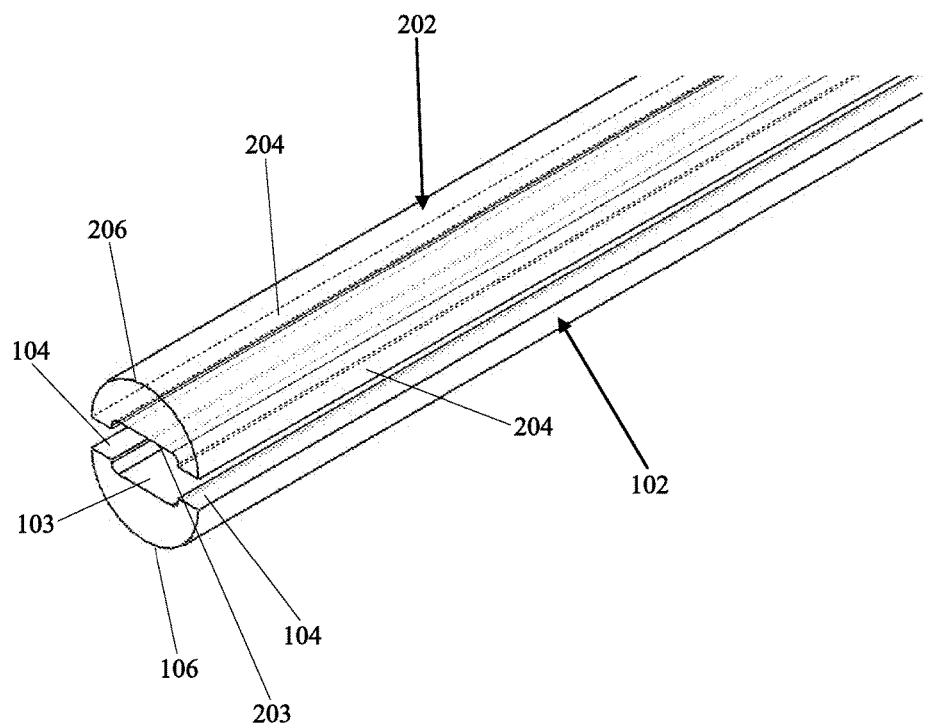
FIG. 2 is a partial enlargement in a perpendicular orientation of two submounts in FIG. 1 according to the present disclosure.

FIG. 1 is a cross-section view of an optical fiber combiner assembly in an isometric-view orientation according to the present disclosure. FIG. 2 is a partial enlargement in a perpendicular orientation of two submounts not yet connected to form a combiner mount in FIG. 1 according to the present disclosure. Referring to FIG. 1 and FIG. 2, an optical fiber combiner assembly 200 comprises a combiner mount 101 and an optical fiber combiner 130. The combiner mount 101 comprises a first submount 102 and a second submount 202. The first submount 102 comprises a U-groove 103 in a lengthwise direction and two flat portions 104 symmetrically connected to the U-groove 103 in a widthwise direction. Similarly, the second submount 202 comprises a U-groove 203 in a lengthwise direction and two flat portions 204 symmetrically connected to the U-groove 203 in a widthwise direction. The two flat portions 104 of the first submount 102 and the two flat portions 204 of the second submount 202 are mechanically coincident in a way to form a combiner cavity 205 between the U-groove 103 of the first submount 102 and the U-groove 203 of the second submount 202.

The optical fiber combiner 130 comprises multiple input optical fibers 111 and an output optical fiber 112. The optical fiber combiner 130 is fixed in the combiner cavity 205. The optical fiber combiner 130 is basically an N×1 tapered fiber bundle pump combiner, where "N" is a number of possible input optical fibers that satisfy the brightness conservation theorem. The optical fiber combiner 130 is hexagonally packed fiber bundles fused and tapered for stability and high packing density. The resulting cross section of these hexagonally stacked bundles is close to a circle, and thus eases splicing with the output optical fiber 112. The optical fiber combiner 130 illustrated in FIG. 1 (and FIGS. 3-5) is for illustrations only. The optical fiber combiner 130 is used to combine several input multimode fiber pigtails (i.e. the multiple input optical fibers 111) from laser diode pumps into the output optical fiber 112. It is typically fabricated in a process similar to fused fiber couplers by bundling in parallel N multimode optical fibers that have been stripped of their polymer coatings with a coating-stripped portion exposed. The N multimode optical fibers are then fused and tapered by heating with a flame, electric arc, oxyhydrogen flame, or a $CO_2$ laser beam. The fused and tapered section is then cleaved in the middle and spliced to the output optical fiber 112 also stripped beforehand for a coating-stripped portion near a fusion splice 115. The multiple input optical fibers 111 and the output optical fiber 112 are partially stripped for a stripped portion substantially in a middle area 116 of the optical fiber combiner 130 and two non-stripped portions 117 and 118 out of the stripped portion. The optical fiber combiner 130 is further fixed in the combiner cavity 205 with three epoxies respectively applied in three areas. The first area is in the middle area 116 of the stripped portion of the optical fiber combiner 130 near the fusion splice 115, where the output optical fiber 112 is spliced to a smaller taper end of the TFB. The second area 119 is near an interface between the stripped portion of the optical fiber combiner 130 and the non-stripped portion 117 near the multiple input optical fibers 111. The third area 120 is near an interface between the stripped portion of the optical fiber combiner 130 and the non-stripped portion 118 near the output optical fiber 112. The three epoxies with different refractive indices accommodated in the three areas not only fix the optical fiber combiner 130 in place but also serve thermally conductive contacts to effectively disperse the heat generated in the optical fiber combiner 130 to the combiner mount 101, further dispersing to surroundings of the combiner mount 101. This is especially true when both the first submount 102 and the second submount 202 are in contact with the three epoxies to doubly increase thermal contact area. In thermal dispersion, the thermal contact approach outperforms a conventional approach using air as a thermal dispersion medium. Furthermore, the three epoxies comprise respective high, low, and high refractive indices relative to a refractive index of the cladding of the multiple input optical fibers 111 and the output optical fiber 112. The epoxy with the high refractive index is used to help strip cladding modes, preventing the cladding modes from launching into a buffer layer and a jacket of the two non-stripped portions 117 and 118 in the optical fiber combiner 130 to minimize occurrence of localized hot spots which may possibly damage the optical fiber combiner 130. The epoxy with the low refractive index is applied to prevent guided modes from leaking out of the optical fiber combiner 130, resulting in an optical loss and accumulated heat.

When a fiber laser is used in cutting or welding applications, the originally forward-propagating laser light may be back-reflected and returned from a workpiece to reach the multiple input optical fibers 111 of the optical fiber combiner 130. This unwanted back-reflected laser light may launch into the polymer coatings of the multiple input optical fibers 111, creating the hot spots and reducing reliability, and thus must be removed before launching into the polymer coatings. The epoxy with the high refractive index applied to the second area can efficiently do the job. Similarly, the multiple forward-propagating laser pumps, which are inputted from the multiple input optical fibers 111, combined in the optical fiber combiner 130, and outputted to the output optical fiber 112 via the coating-stripped portion, may launch into the non-stripped portion 118. Thus, the epoxy with the high refractive index must be applied to the third area 120 to efficiently remove undesired forward-propagating cladding modes of the pumps. In brief, when a fiber laser reaching kWs or tens of kWs, an optical energy leakage from both forward and back-reflected propagating core-guided light to the adjacent cladding at air-quartz interfaces and splices between various fibers becomes significant. Once in the cladding, the optical energy leakage induces thermal loads on a polymeric coating surrounding the cladding. The coating, originally configured only to maintain the structural integrity, may experience such thermal loads, which, in worst case, damage both the optical fiber combiner 130 and optical components upstream.

The first submount 102 and the second submount 202 may be built based on 3-D printing, cold-casting, or other means, taking advantages of cost-effectiveness using such technologies. In building the first submount 102 and the second submount 202 with the cold-casting, a metal powder filler can be used in processes of mixing with a resin and applying the mixture into a mold of the first submount 102 and the second submount 202. Depending on filler concentration, the first submount 102 and the second submount 202 give a predetermined thermal conductivity and a predetermined thermal expansion coefficient that are needed in the optical fiber combiner applications. The first submount 102 and the second submount 202 may be made of a polymer material with a proper filler for a predetermined thermal conductivity and a predetermined thermal expansion coefficient. For various applications, the first submount 102 and the second submount 202 may be made of an optically transparent material. The first submount 102 and the second submount 202 may be made of a sapphire substrate, providing a thermal conductivity of 26 W/m° C. and a thermal expansion coefficient of $6 \times 10^{-6}$/° C. (parallel to C-axis), with machining and grinding for the U-groove 103 in the first submount 102 and the U-groove 203 in the second submount 202. In FIG. 1 and FIG. 2, each of the first submount 102 and the second submount 202 may respectively comprise a first semicircle contour 106 and a second semicircle contour 206, wherein when the combiner cavity 205 is formed, the combiner mount 101 comprises a circular contour 150 (in FIG. 1).

Figure 3:
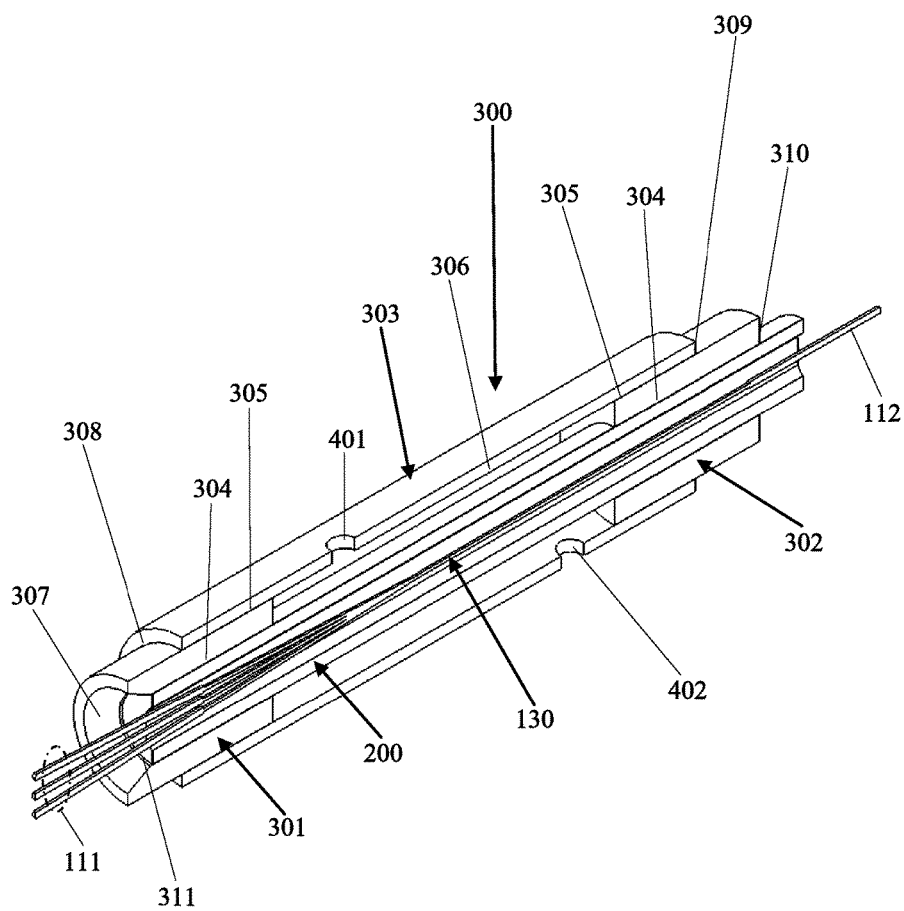
FIG. 3 is a cross-section view of a water-cooled package of an optical fiber combiner in an isometric-view orientation according to the present disclosure.
Figure 4:
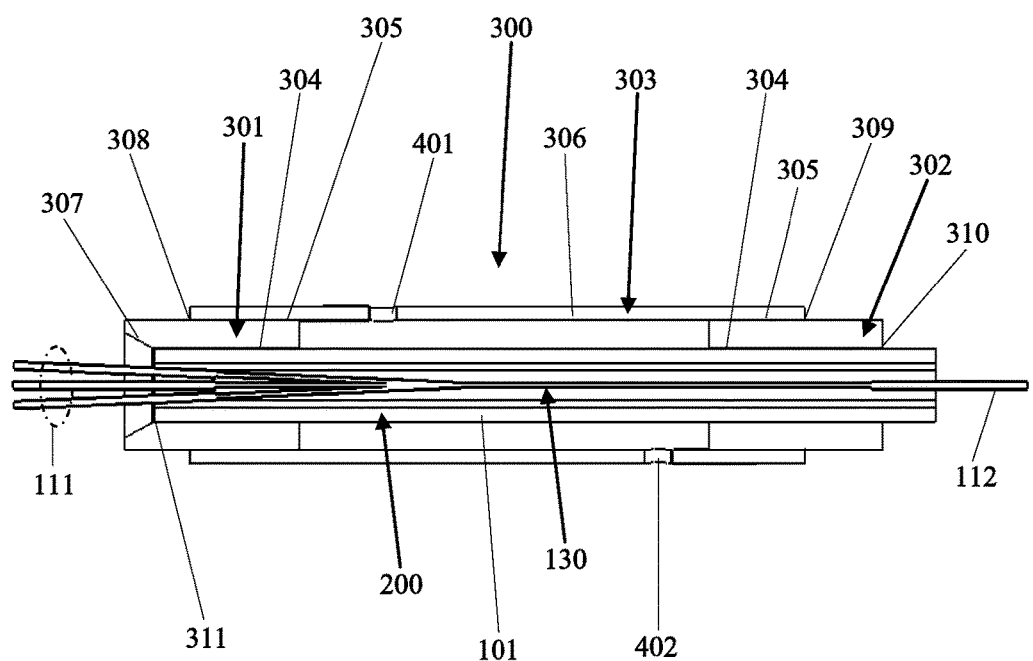
FIG. 4 is a cross-section view of the water-cooled package of the optical fiber combiner in FIG. 3 in a right-view orientation according to the present disclosure.
Figure 5:
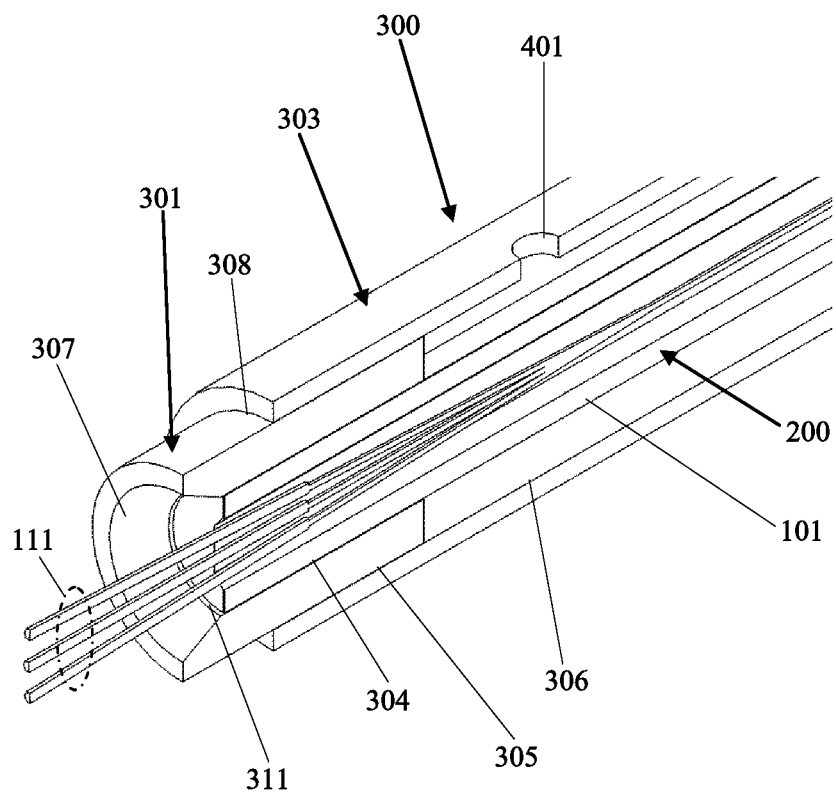
FIG. 5 is a partial enlargement of the cross-section view in FIG. 3 according to the present disclosure.

FIG. 3 is a cross-section view of a water-cooled package of an optical fiber combiner in an isometric-view orientation according to the present disclosure. FIG. 4 is a cross-section view of a package of the optical fiber combiner in a right-view orientation according to the present disclosure. FIG. 5 is a partial enlargement of the cross-section view in FIG. 3 according to the present disclosure. Referring to FIGS. 3-5, a water-cooled package of optical fiber combiner 300 comprises the optical fiber combiner assembly 200 depicted in FIG. 1 and FIG. 2, a front end cap 301, a rear end cap 302, and a housing 303. The water-cooled package of optical fiber combiner 300 operates for a uniform temperature gradient inside the housing 303 and for long-term reliability. Each of the front end cap 301 and the rear end cap 302 comprises an end cap inner wall 304 and an end cap outer wall 305. Each of the end cap inner wall 304 of the front end cap 301 and the rear end cap 302 is configured to accommodate the optical fiber combiner assembly 200. The housing 303 comprises an internally hollow space and a housing inner wall 306. The end cap outer wall 304 of each of the front end cap 301 and the rear end cap 302 is concentrically mated with the housing inner wall 306. The housing 303 is configured to hold and fix the front end cap 301 and the rear end cap 302 and to accommodate the cooling water to facilitate thermal dispersion. When fixed and sealed in the housing 303, the front end cap 301 and the rear end cap 302 can prevent the cooling water from leaking out via two ends of the housing. The housing 303 is waterproof at each of interfaces between the front end cap 301 and the combiner mount 101, between the combiner mount 101 and the rear end cap 302, between the front end cap 301 and the housing 303, and between the rear end cap 302 and the housing 303. When the optical fiber combiner assembly 200 is concentrically mated and sealed with the front end cap 301 and the rear end cap 302, cooling water in the water-cooled package of optical fiber combiner 300 is prevented from immersing the optical fiber combiner 130. The configurations can minimize varying stress-induced optical degradations and maintain beam quality of a laser light exiting the optical fiber combiner assembly 200. The front end cap 301 may further comprise a funnel structure 307 configured to accommodate the multiple input optical fibers 111 and to allow an epoxy to apply so as to secure the multiple input optical fibers 111 in place and serve as a strain relief to allow flexibility without exerting stress on the multiple input optical fibers 111.

Each of the front end cap 301 and the rear end cap 302 protrudes the housing 303 so that respective interface edges 308 and 309 are formed, wherein a first bonding agent can easily be applied and wicked from the respective interface edges 308 and 309 into gaps between the front end cap 301 and the housing 303 and between the rear end cap 302 and the housing 303 to fix thereof. Furthermore, the optical fiber combiner assembly 200 protrudes the rear end cap 302 so that an interface edge 310 is formed and wherein a second bonding agent can easily be applied and wicked from the interface edge 310 into gaps between the optical fiber combiner assembly 200 and the rear end cap 302 to fix thereof. The optical fiber combiner assembly 200 is recessed from the front end cap 301 so that an interface edge 311 is formed, wherein a third bonding agent can easily be applied and wicked from the interface edge 311 into gaps between the optical fiber combiner assembly 200 and the front end cap 301 to fix thereof. Each of the first, the second, and the third bonding agents may comprise a solder or an epoxy.

The end cap outer wall 305 of each of the front end cap 301 and the rear end cap 302 may comprise a coating of gold. When the end cap outer wall 305 of each of the front end cap 301 and the rear end cap 302 is concentrically mated with the housing inner wall 306, which is made of copper, a solder can be used to fill gaps between the end cap outer wall 305 and the housing inner wall 306 and to fix the front end cap 301 and the rear end cap 302 in the housing 303. In this case, the front end cap 301 and rear end cap 302 can be readily fixed in the housing 303 by solder bonding, taking one of advantages that the solder has a inherently high melting temperature such as 180 degrees in Celsius relative to an epoxy, a glue, or an adhesive having a glass transition temperature (Tg) of 100 degrees in Celsius or so. If the first submount 102 and the second submount 202 are made of glass or sapphire, outer walls of the first submount 102 and the second submount 202 near their two ends can be coated with the gold. When inserted in the front end cap 301 and the rear end cap 302, the combiner mount 101 can be fixed and sealed with the solder. In this case, the water-cooled package of optical fiber combiner 300 using the solder can survive in the temperature of 180 degrees in Celsius relative to 100 degrees in Celsius or so for the water-cooled package of optical fiber combiner 300 using the epoxy. The housing 303 further comprises a water inlet 401 and a water outlet 402 configured to circulate the cooling water and to remove heat from the front end cap 301, the rear end cap 302, and the optical fiber combiner assembly 200, facilitating thermal dispersion.

Whereas preferred embodiments of the present disclosure have been shown and described, it will be realized that alterations, modifications, and improvements may be made thereto without departing from the scope of the following claims. Another water-cooled package of optical fiber combiner using various kinds of combinations to accomplish the same or different objectives could be easily adapted for use from the present disclosure. Accordingly, the foregoing descriptions and attached drawings are by way of example only, and are not intended to be limiting.

What is claimed is:

1. A water-cooled package of an optical fiber combiner, comprising:
    an optical fiber combiner assembly comprising:
        a combiner mount comprising a first submount and a second submount each respectively comprising a U-groove in a lengthwise direction and two flat portions symmetrically connected to the U-groove in a widthwise direction, wherein the two flat portions of the first submount and the two flat portions of the second submount are mechanically coincident in a way to form a combiner cavity between the U-groove of the first submount and the U-groove of the second submount; and
        an optical fiber combiner with multiple input optical fibers and an output optical fiber, wherein the optical fiber combiner is fixed in the combiner cavity;
    a front end cap and a rear end cap each respectively comprising an end cap inner wall and an end cap outer wall, the end cap inner wall of each of the front end cap and the rear end cap configured to accommodate the optical fiber combiner assembly; and
    a housing comprising an internally hollow space and a housing inner wall, the housing configured to hold and fix the front end cap and the rear end cap and to accommodate a cooling water to facilitate thermal dispersion, wherein a water-cooled cavity is formed by an enclosure of the front end cap, the rear end cap, the optical fiber combiner assembly, and the housing inner wall,
    wherein the housing is waterproof at each of interfaces between the front end cap and the combiner mount, between the combiner mount and the rear end cap, between the front end cap and the housing, and between the rear end cap and the housing;
    wherein the optical fiber combiner is configured to receive optical energy from multiple pump lasers inputted via the multiple input optical fibers, combine the multiple pump lasers, and couple the multiple input optical fibers into the output optical fiber; and
    wherein the multiple input optical fibers and the output optical fiber are partially stripped for a stripped portion substantially in a middle area of the optical fiber combiner and two non-stripped portions out of the stripped portion.

2. The water-cooled package of claim 1, wherein the first submount and the second submount are made of a polymer material.

3. The water-cooled package of claim 2, wherein the polymer material is mixed with a filler, configured to achieve a predetermined thermal conductivity and a predetermined thermal expansion coefficient.

4. The water-cooled package of claim 1, wherein each of the first submount and the second submount comprises a mixture of a resin and metal powders, configured to achieve a predetermined thermal conductivity and a predetermined thermal expansion coefficient.

5. The water-cooled package of claim 1, wherein each of the first submount and the second submount respectively comprises a semicircle contour, and wherein when the combiner cavity is formed, the combiner mount comprises a circular contour.

6. The water-cooled package of claim 1, wherein the combiner cavity comprises three epoxies configured to fix the optical fiber combiner and serve as thermally conductive contacts, wherein the three epoxies comprise respective high, low, and high refractive indices relative to a refractive index of a cladding of the multiple input optical fibers and the output optical fiber, wherein one of the three epoxies with the high refractive index is applied to help strip cladding modes, preventing the cladding modes from entering a buffer layer and a jacket of the two non-stripped portions in the optical fiber combiner, and wherein one of the three epoxies with the low refractive index is applied to prevent guided modes from leaking out of the optical fiber combiner, resulting in an optical loss.

7. The water-cooled package of claim 6, wherein the thermally conductive contacts are connected to both the first submount and the second submount so as to doubly increase thermal contact area to remove heat from the optical fiber combiner to surroundings.

8. The water-cooled package of claim 1, wherein each of the first submount and the second submount is made of an optically transparent material.

9. The water-cooled package of claim 1, wherein each of the first submount and the second submount is made of sapphire.

10. The water-cooled package of claim 1, wherein the front end cap further comprises a funnel structure configured to accommodate the multiple input optical fibers and to allow an epoxy to apply so as to secure the multiple input optical fibers in place and serve as a strain relief to allow flexibility without exerting stress on the multiple input optical fibers.

11. The water-cooled package of claim 1, wherein each of the front end cap and the rear end cap protrudes the housing so that respective interface edges are formed and that a first bonding agent can be applied and wicked from the respective interface edges into gaps between the front end cap and the housing and between the rear end cap and the housing to fix thereof.

12. The water-cooled package of claim 11, wherein the first bonding agent comprises a solder or an epoxy.

13. The water-cooled package of claim 1, wherein the optical fiber combiner assembly protrudes the rear end cap so that an interface edge is formed and that a second bonding agent can be applied and wicked from the interface edge into gaps between the optical fiber combiner assembly and the rear end cap to fix thereof.

14. The water-cooled package of claim 13, wherein the second bonding agent comprises a solder or an epoxy.

15. The water-cooled package of claim 1, wherein the optical fiber combiner assembly is recessed from the front end cap so that an interface edge is formed and that a third bonding agent can be applied and wicked from the interface edge into gaps between the optical fiber combiner assembly and the front end cap to fix thereof.

16. The water-cooled package of claim 15, wherein the third bonding agent comprises a solder or an epoxy.

17. The water-cooled package of claim 1, wherein each end cap outer wall of the front end cap and the rear end cap is concentrically mated with the housing inner wall.

18. The water-cooled package of claim 17, wherein each end cap outer wall comprises a coating of gold, substantially in contact with the housing inner wall.

19. The water-cooled package of claim 18, wherein the housing is made of copper, and wherein a solder is used to fill gaps between the end cap outer wall and the housing inner wall and to fix the front end cap and the rear end cap in the housing.

20. The water-cooled package of claim 1, wherein the housing further comprises a water inlet and a water outlet configured to circulate the cooling water and to remove heat from the front end cap, the rear end cap, and the optical fiber combiner assembly, facilitating thermal dispersion.

* * * * *